United States Patent
Bai et al.

(10) Patent No.: US 12,181,000 B2
(45) Date of Patent: Dec. 31, 2024

(54) DEEP GROOVE BALL BEARING WITH SPLIT CAGE

(71) Applicant: C&U COMPANY LIMITED., WenZhou (CN)

(72) Inventors: Xuefeng Bai, WenZhou (CN); Jialiang Xu, WenZhou (CN)

(73) Assignee: C&U COMPANY LIMITED., Wenzhou (CN)

( * ) Notice: Subject to any disclaimer, the term of this patent is extended or adjusted under 35 U.S.C. 154(b) by 0 days.

(21) Appl. No.: 17/779,136

(22) PCT Filed: Sep. 16, 2021

(86) PCT No.: PCT/CN2021/118718
§ 371 (c)(1),
(2) Date: Jan. 5, 2023

(87) PCT Pub. No.: WO2023/272953
PCT Pub. Date: Jan. 5, 2023

(65) Prior Publication Data
US 2024/0167515 A1 May 23, 2024

(30) Foreign Application Priority Data

Jun. 30, 2021 (CN) .......................... 202110736966.1

(51) Int. Cl.
*F16C 19/16* (2006.01)
*F16C 33/66* (2006.01)
(52) U.S. Cl.
CPC .......... *F16C 33/6648* (2013.01); *F16C 19/16* (2013.01)

(58) Field of Classification Search
CPC .. F16C 19/16; F16C 33/6648; F16C 33/6651; F16C 33/664; F16C 33/3831;
(Continued)

(56) References Cited

U.S. PATENT DOCUMENTS

| | | | |
|---|---|---|---|
| 2004/0211638 A1* | 10/2004 | Ikeda | F16C 41/001 192/41 A |
| 2021/0140477 A1* | 5/2021 | Akimoto | F16C 19/16 |
| 2023/0193954 A1* | 6/2023 | Bai | F16C 33/6651 384/530 |

FOREIGN PATENT DOCUMENTS

| | | |
|---|---|---|
| CN | 201125938 Y | 10/2008 |
| CN | 210830170 U | 6/2020 |

(Continued)

*Primary Examiner* — James Pilkington
*Assistant Examiner* — Aimee Tran Nguyen
(74) *Attorney, Agent, or Firm* — Bayramoglu Law Offices LLC (57) ABSTRACT

A deep groove ball bearing with a split cage includes an outer ring, an inner ring, steel balls, an upper frame body, a bearing frame, and a lower frame body. Pocket grooves are formed in the bearing frame. The bearing frame is provided with a connecting piece. A first insertion groove and a second insertion groove are formed in both side walls of the connecting piece. A connecting groove is formed in a bottom surface of each of the pocket grooves. An oil storage cavity is formed in the upper frame body. The oil storage cavity is provided with a positioning flange at an opening. The positioning flange is in insertion fit with the connecting groove. The lower frame body is provided with arc-shaped grooves at positions corresponding to the pocket grooves. A connecting seat is formed on the lower frame body.

10 Claims, 5 Drawing Sheets

(58) Field of Classification Search
CPC .............. F16C 33/3862; F16C 33/3868; F16C 33/3875; F16C 33/3887; F16C 33/7806; F16C 33/78; F16C 33/583; F16C 33/3881
See application file for complete search history.

(56) References Cited

FOREIGN PATENT DOCUMENTS

| | | |
|---|---|---|
| CN | 210949557 U | 7/2020 |
| CN | 213117165 U | 5/2021 |
| JP | 2012002243 A | 1/2012 |
| JP | 2013092241 A | 5/2013 |
| WO | WO-2017047770 A1 * | 3/2017 |

* cited by examiner

DEEP GROOVE BALL BEARING WITH SPLIT CAGE

CROSS REFERENCE TO THE RELATED APPLICATIONS

This application is the national phase entry of International Application No. PCT/CN2021/118718, filed on Sep. 16, 2021, which is based upon and claims priority to Chinese Patent Application No. 202110736966.1, filed on Jun. 30, 2021, the entire contents of which are incorporated herein by reference.

TECHNICAL FIELD

The present disclosure relates to the technical field of bearings, and in particular, to a deep groove ball bearing with a split cage.

BACKGROUND

A deep groove ball bearing is usually provided with a cage, which is usually assembled between the inner ring and outer ring raceways. The cage usually has an annular body structure and ball pocket holes evenly distributed along the circumference. The ball pocket hole usually adopts a concave spherical surface similar to a rolling element of a ball bearing and has a slightly larger radius of curvature, and an inner diameter surface and an outer diameter surface of the cage body are opened separately. However, in the process of use, high-speed working conditions of rapid acceleration or rapid deceleration easily cause a high temperature rise, which makes the cage melt and crack, and the cage is prone to impact fracture in the pocket hole or other positions. It is necessary to focus on a lubricating state of the cage balls and timely replenish oil to the cage. However, for the prior cage, it is difficult to replenish oil, and the assembly is also very inconvenient, which reduces the overall use effect of the cage and is not conducive to improving production and processing efficiency.

SUMMARY

In view of deficiencies in the prior art, the present disclosure provides a deep groove ball bearing with a split cage, which has an overall structure convenient for installation, higher stability, and improved use effects and production and processing efficiency.

In order to achieve the above objective, the present disclosure provides a deep groove ball bearing with a split cage, including an outer ring, an inner ring, a cage, and steel balls. The cage is arranged between the outer ring and the inner ring. The cage is split into an upper frame body, a bearing frame, and a lower frame body. Pocket grooves configured to accommodate the steel balls are formed in the bearing frame at intervals. The bearing frame is provided with a connecting piece between any two adjacent pocket grooves. A first insertion groove is formed in an outer wall of the connecting piece. A second insertion groove is formed in an inner wall of the connecting piece. A connecting groove is formed in a bottom surface of each of the pocket grooves. An oil storage cavity is formed in the upper frame body. An opening of the oil storage cavity is arranged toward the connecting groove. The oil storage cavity is provided with oil storage cotton. The oil storage cavity is provided with a positioning flange in a circumferential direction of the opening. The positioning flange is in insertion fit with the connecting groove to form a fixed connection between the upper frame body and the bearing frame. The lower frame body is provided with arc-shaped grooves at positions corresponding to the pocket grooves. Each of the arc-shaped grooves and each of the pocket grooves are combined to form a pocket hole. A connecting seat is formed between any two adjacent arc-shaped grooves on the lower frame body. A first insertion member and a second insertion member are arranged on the connecting seat. A clamping gap is formed between the first insertion member and the second insertion member. The first insertion member is in insertion fit with the first insertion groove. The second insertion member is in insertion fit with the second insertion groove. Ends of the first insertion member and the second insertion member pass through the bearing frame and form positioning members. The upper frame body is provided with positioning holes at positions corresponding to the positioning members. Each of the positioning members is in insertion fit with each of the positioning holes.

Such an arrangement has the following beneficial effects: in such an arrangement, the cage is split into the upper frame body, the bearing frame, and the lower frame body. After the steel balls are loaded in the pocket grooves on the bearing frame, the lower frame body is inserted with the bearing frame, and the first insertion member and the second insertion member on the bearing frame are respectively inserted with the corresponding insertion grooves to complete positioning. In addition, the first insertion member and the second insertion member have the function of clamping and positioning, which improves the stability of the overall structure. After installation is completed, each of the arc-shaped grooves and each of the pocket grooves are combined to form the pocket hole to realize positioning of each of the steel balls. Then, the upper frame body is installed. The positioning holes on the upper frame body are fixedly inserted with the positioning members on the two insertion members. In addition, the positioning flange on the upper frame body is inserted with the connecting groove to realize combined installation of the whole frame body. This structure is simple, easy to realize, and easy to assemble, and has good stability, and it is also convenient to replace the parts. After lubricating oil in the upper frame body is used up, it can be quickly replaced to improve the assembly efficiency.

As a further arrangement of the present disclosure, coating cotton may be arranged in each of the arc-shaped grooves of the lower frame body, and cooling liquid may be adsorbed in the coating cotton.

Such an arrangement has the following beneficial effects: in such an arrangement, the steel balls can be effectively cooled to avoid high temperature rise, ensure the stability of the cage structure, and improve the use stability of the overall structure.

As a further arrangement of the present disclosure, the lower frame body may be provided with liquid storage cavities configured to store the cooling liquid at positions corresponding to the arc-shaped grooves, and each of the liquid storage cavities may be connected to the coating cotton through a connecting tube.

Such an arrangement has the following beneficial effects: in such an arrangement, the coating cotton on the lower frame body can be used for a longer time, reducing a replacement frequency, and the steel balls can be effectively cooled. In addition, the structure is simple and easy to realize.

As a further arrangement of the present disclosure, the first insertion member may be arranged in a wedge shape, and a shape of the first insertion groove may be matched with the shape of the first insertion member.

Such an arrangement has the following beneficial effects: in such an arrangement, insertion of the first insertion groove and the first insertion member has a good guiding effect, and can also play a foolproof role. In addition, the structure is simple, the production is convenient, and the use effect of the overall structure is improved.

As a further arrangement of the present disclosure, both side walls of the first insertion member may be arranged in a wave shape, both side walls of the first insertion groove may be provided with abutting elastic pieces at intervals, and the abutting elastic pieces may be arranged obliquely.

Such an arrangement has the following beneficial effects: in such an arrangement, when the first insertion member is inserted into the first insertion groove, the abutting elastic pieces are compressed. After it is completely in place, the abutting elastic pieces are reset. Each of the abutting elastic pieces will be clamped in a wave gap on the side wall of the first insertion member, such that the insertion of the first insertion member is more stable, and it is not easy to loose. In addition, the structure is simple and easy to realize.

As a further arrangement of the present disclosure, both side walls of the first insertion member may be provided with guiding grooves. The upper frame body may be provided with guiding insertion members at positions corresponding to the guiding grooves. The bearing frame may be provided with guiding through holes at positions corresponding to the guiding grooves. The guiding insertion members may pass through the guiding through holes to be in insertion fit with the guiding grooves.

Such an arrangement has the following beneficial effects: in such an arrangement, the stability of the connection of the overall structure is further increased. In addition, the structure is simple and easy to realize.

As a further arrangement of the present disclosure, a guiding member and a guiding groove may be arranged between the second insertion groove and the second insertion member, and the guiding member may be slidably matched with the guiding groove.

Such an arrangement has the following beneficial effects: in such an arrangement, the stability of the overall structure is increased, and cracking is not easy to occur during use. In addition, the structure is simple and easy to realize, and the use effect of the overall structure is improved.

As a further arrangement of the present disclosure, the upper frame body, the bearing frame, and the lower frame body may be made of injection materials.

Such an arrangement has the following beneficial effects: in such an arrangement, the injection materials are used, preferably PA66 plus glass fiber, PA46 plus glass fiber, and PEEK plus glass fiber to ensure that the strength of the cage meets the requirements.

As a further arrangement of the present disclosure, a dust cover may be arranged between the outer ring and the inner ring.

Such an arrangement has the following beneficial effects: in such an arrangement, the shielding of the steel balls is ensured, and the use effect of the overall structure is improved. In addition, the structure is simple and easy to realize, effectively avoiding leakage of the lubricating oil, and increasing the overall lubricating effect.

As a further arrangement of the present disclosure, a first connecting step may be formed on an inner wall of the outer ring, a second connecting step may be formed on an outer wall of the inner ring, and the dust cover may be clamped between the first connecting step and the second connecting step.

Such an arrangement has the following beneficial effects: the connection effect of the dust cover is effectively improved. In addition, the structure is simple and easy to realize, and the use stability of the overall structure is improved.

DETAILED DESCRIPTION OF THE EMBODIMENTS

Figure 1:
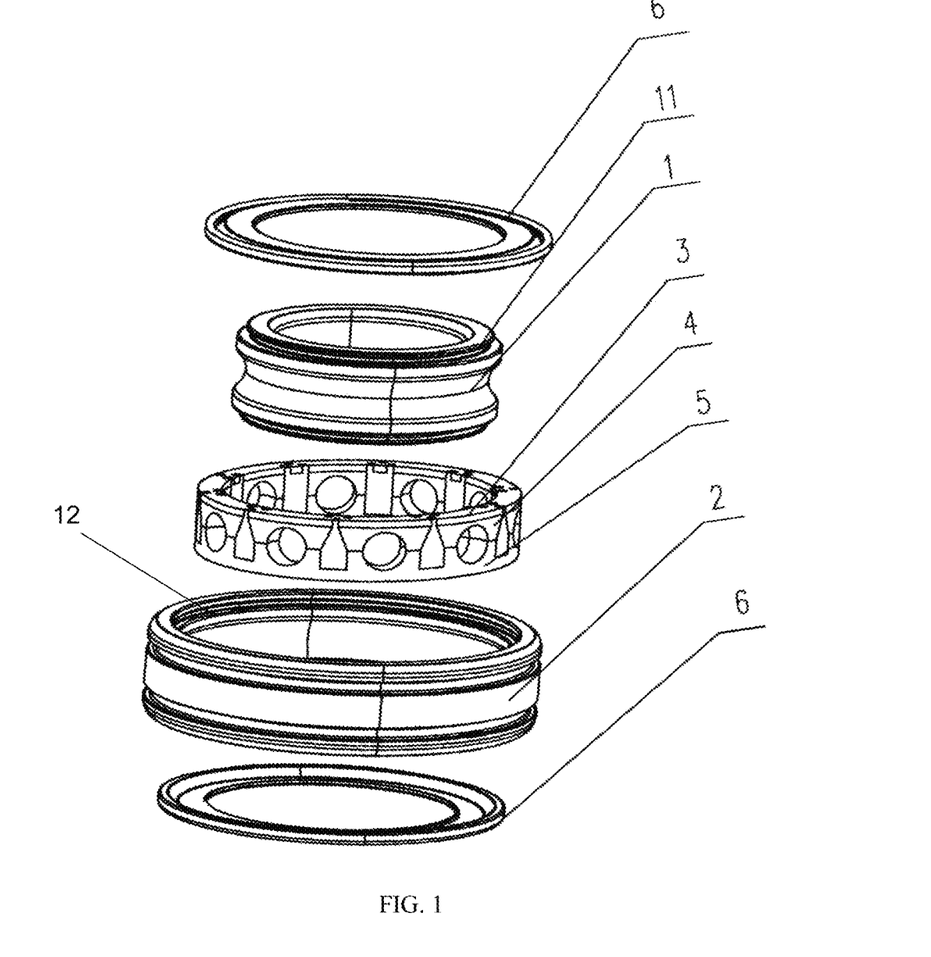
FIG. 1 is an exploded view of an overall structure of a first embodiment, a second embodiment, a third embodiment, a fourth embodiment, and a fifth embodiment of the present disclosure.
Figure 2:
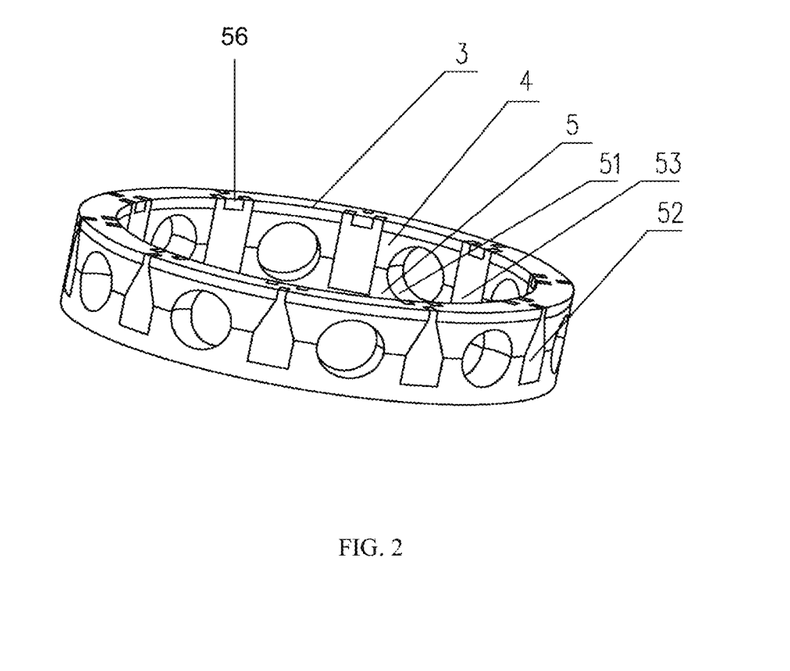
FIG. 2 is a schematic structural diagram of a cage in the first embodiment, the second embodiment, the third embodiment, the fourth embodiment, and the fifth embodiment of the present disclosure.
Figure 3:
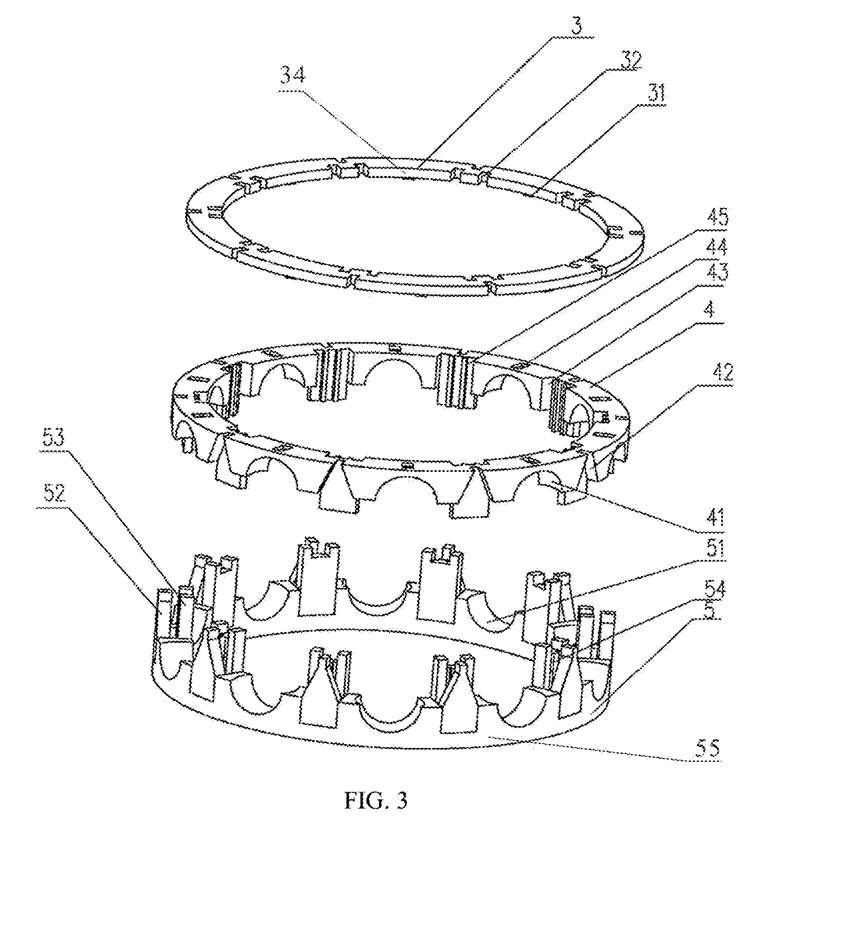
FIG. 3 is a schematic diagram of an explosion structure of the cage in the first embodiment of the present disclosure.

A first embodiment of a deep groove ball bearing with a split cage of the present disclosure is shown in FIG. 1 to FIG. 3, including an outer ring 2, an inner ring 1, a cage, and steel balls. The cage is arranged between the outer ring 2 and the inner ring 1. The cage is split into an upper frame body 3, a bearing frame 4, and a lower frame body 5. Pocket grooves 41 configured to accommodate the steel balls are formed in the bearing frame 4 at intervals. The bearing frame 4 is provided with a connecting piece between any two adjacent pocket grooves 41. A first insertion groove 42 is formed in an outer wall of the connecting piece. A second insertion groove 43 is formed in an inner wall of the connecting piece. A connecting groove 44 is formed in a bottom surface of the pocket groove 41. An oil storage cavity 34 is formed in the upper frame body 3. An opening of the oil storage cavity 34 is arranged toward the connecting groove 44. The oil storage cavity 34 is provided with oil storage cotton. The oil storage cavity 34 is provided with a positioning flange 31 in a circumferential direction of the opening. The positioning flange 31 is in insertion fit with the connecting groove 44 to form a fixed connection between the upper frame body 3 and the bearing frame 4. The lower frame body 5 is provided with arc-shaped grooves 51 at positions corresponding to the pocket grooves 41. The arc-shaped groove 51 and the pocket groove 41 are combined to form a pocket hole. A connecting seat 55 is formed between any two adjacent arc-shaped grooves 51 on the lower frame body 5. A first insertion member 52 and a second insertion member 53 are arranged on the connecting seat 55. A clamping gap 54 is formed between the first insertion member 52 and the second insertion member 53. The first insertion member 52 is in insertion fit with the first insertion groove 42. The second insertion member 53 is in insertion fit with the second insertion groove 43. Ends of the first insertion member 52 and the second insertion member 53 pass through the bearing frame 4 and form positioning members 56. The upper frame body 3 is provided with positioning holes 32 at positions corresponding to the positioning members 56. The positioning member is in insertion fit with the positioning hole 32. Coating cotton is arranged in the arc-shaped groove 51 of the lower frame body 5, and cooling liquid is adsorbed in the coating cotton. The lower frame body 5 is provided with liquid storage cavities configured to store the cooling liquid at positions corresponding to the arc-shaped grooves 51, and the liquid storage cavity is connected to the coating cotton through a connecting tube. The first insertion member 52 is arranged in a wedge shape, and a shape of the first insertion groove 42 is matched with the shape of the first insertion member 52. A guiding member 45 and a guiding groove are arranged between the second insertion groove 43 and the second insertion member 53, and the guiding member 45 is slidably matched with the guiding groove. The upper frame body 3, the bearing frame 4, and the lower frame body 5 are made of injection materials. A dust cover 6 is arranged between the outer ring 2 and the inner ring 1. A first connecting step 11 is formed on an inner wall of the outer ring 2, a second connecting step 12 is formed on an outer wall of the inner ring 1, and the dust cover 6 is clamped between the first connecting step 11 and the second connecting step 12.

Figure 4:
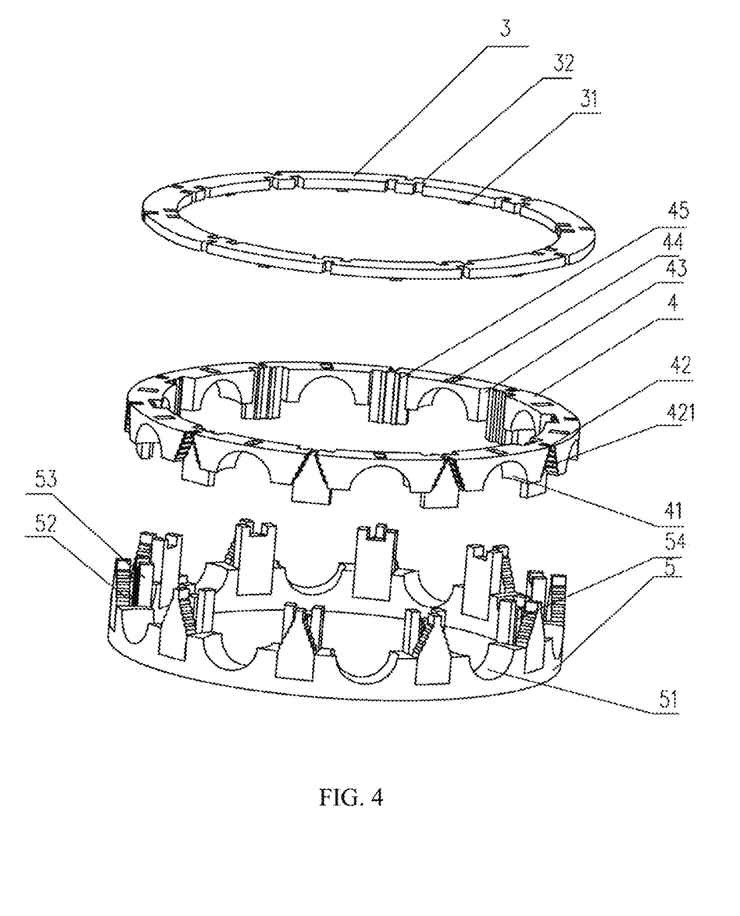
FIG. 4 is a schematic diagram of an explosion structure of the cage in the second embodiment and the fourth embodiment of the present disclosure.

A second embodiment of a deep groove ball bearing with a split cage of the present disclosure is shown in FIG. 1, FIG. 2, and FIG. 4, including an outer ring 2, an inner ring 1, a cage, and steel balls. The cage is arranged between the outer ring 2 and the inner ring 1. The cage is split into an upper frame body 3, a bearing frame 4, and a lower frame body 5. Pocket grooves 41 configured to accommodate the steel balls are formed in the bearing frame 4 at intervals. The bearing frame 4 is provided with a connecting piece between any two adjacent pocket grooves 41. A first insertion groove 42 is formed in an outer wall of the connecting piece. A second insertion groove 43 is formed in an inner wall of the connecting piece. A connecting groove 44 is formed in a bottom surface of the pocket groove 41. An oil storage cavity 34 is formed in the upper frame body 3. An opening of the oil storage cavity 34 is arranged toward the connecting groove 44. The oil storage cavity 34 is provided with oil storage cotton. The oil storage cavity 34 is provided with a positioning flange 31 in a circumferential direction of the opening. The positioning flange 31 is in insertion fit with the connecting groove 44 to form a fixed connection between the upper frame body 3 and the bearing frame 4. The lower frame body 5 is provided with arc-shaped grooves 51 at positions corresponding to the pocket grooves 41. The arc-shaped groove 51 and the pocket groove 41 are combined to form a pocket hole. A connecting seat 55 is formed between any two adjacent arc-shaped grooves 51 on the lower frame body 5. A first insertion member 52 and a second insertion member 53 are arranged on the connecting seat 55. A clamping gap 54 is formed between the first insertion member 52 and the second insertion member 53. The first insertion member 52 is in insertion fit with the first insertion groove 42. The second insertion member 53 is in insertion fit with the second insertion groove 43. Ends of the first insertion member 52 and the second insertion member 53 pass through the bearing frame 4 and form positioning members 56. The upper frame body 3 is provided with positioning holes 32 at positions corresponding to the positioning members 56. The positioning member is in insertion fit with the positioning hole 32. Coating cotton is arranged in the arc-shaped groove 51 of the lower frame body 5, and cooling liquid is adsorbed in the coating cotton. The lower frame body 5 is provided with liquid storage cavities configured to store the cooling liquid at positions corresponding to the arc-shaped grooves 51, and the liquid storage cavity is connected to the coating cotton through a connecting tube. The first insertion member 52 is arranged in a wedge shape, and a shape of the first insertion groove 42 is matched with the shape of the first insertion member 52. Both side walls of the first insertion member 52 are arranged in a wave shape, both side walls of the first insertion groove 42 are provided with abutting elastic pieces 421 at intervals, and the abutting elastic pieces 421 are arranged obliquely. The upper frame body 3, the bearing frame 4, and the lower frame body 5 are made of injection materials. A dust cover 6 is arranged between the outer ring 2 and the inner ring 1. A first connecting step 11 is formed on an inner wall of the outer ring 2, a second connecting step 12 is formed on an outer wall of the inner ring 1, and the dust cover 6 is clamped between the first connecting step 11 and the second connecting step 12.

Figure 5:
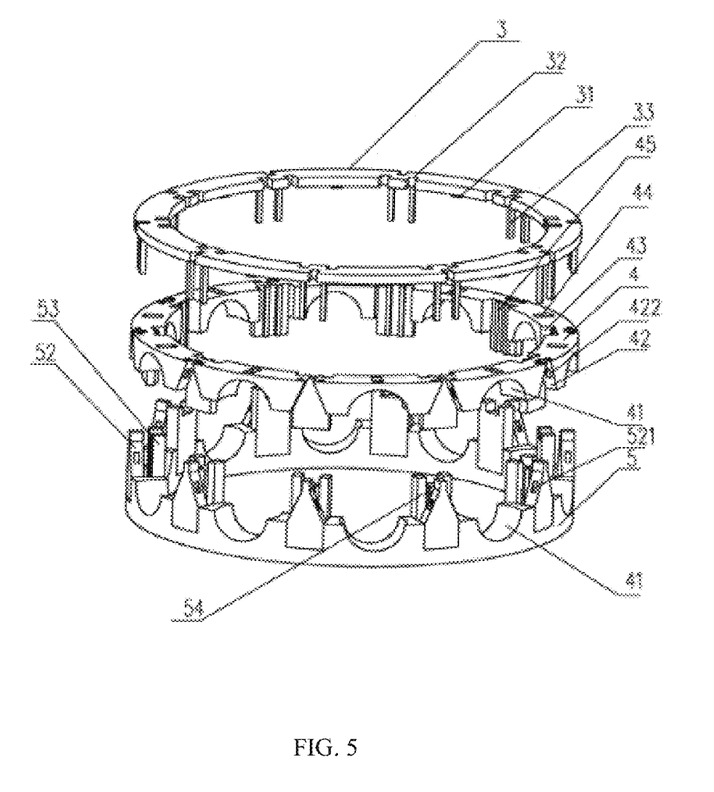
FIG. 5 is a schematic diagram of an explosion structure of the cage in the third embodiment and the fifth embodiment of the present disclosure.

A third embodiment of a deep groove ball bearing with a split cage of the present disclosure is shown in FIG. 1, FIG. 2 and FIG. 5, including an outer ring 2, an inner ring 1, a cage, and steel balls. The cage is arranged between the outer ring 2 and the inner ring 1. The cage is split into an upper frame body 3, a bearing frame 4, and a lower frame body 5. Pocket grooves 41 configured to accommodate the steel balls are formed in the bearing frame 4 at intervals. The bearing frame 4 is provided with a connecting piece between any two adjacent pocket grooves 41. A first insertion groove 42 is formed in an outer wall of the connecting piece. A second insertion groove 43 is formed in an inner wall of the connecting piece. A connecting groove 44 is formed in a bottom surface of the pocket groove 41. An oil storage cavity 34 is formed in the upper frame body 3. An opening of the oil storage cavity 34 is arranged toward the connecting groove 44. The oil storage cavity 34 is provided with oil storage cotton. The oil storage cavity 34 is provided with a positioning flange 31 in a circumferential direction of the opening. The positioning flange 31 is in insertion fit with the connecting groove 44 to form a fixed connection between the upper frame body 3 and the bearing frame 4. The lower frame body 5 is provided with arc-shaped grooves 51 at positions corresponding to the pocket grooves 41. The arc-shaped groove 51 and the pocket groove 41 are combined to form a pocket hole. A connecting seat 55 is formed between any two adjacent arc-shaped grooves 51 on the lower frame body 5. A first insertion member 52 and a second insertion member 53 are arranged on the connecting seat 55. A clamping gap 54 is formed between the first insertion member 52 and the second insertion member 53. The first insertion member 52 is in insertion fit with the first insertion groove 42. The second insertion member 53 is in insertion fit with the second insertion groove 43. Ends of the first insertion member 52 and the second insertion member 53 pass through the bearing frame 4 and form positioning members 56. The upper frame body 3 is provided with positioning holes 32 at positions corresponding to the positioning members 56. The positioning member is in insertion fit with the positioning hole 32. Coating cotton is arranged in the arc-shaped groove 51 of the lower frame body 5, and cooling liquid is adsorbed in the coating cotton. The lower frame body 5 is provided with liquid storage cavities configured to store the cooling liquid at positions corresponding to the arc-shaped grooves 51, and the liquid storage cavity is connected to the coating cotton through a connecting tube. The first insertion member 52 is arranged in a wedge shape, and a shape of the first insertion groove 42 is matched with the shape of the first insertion member 52. Both side walls of the first insertion member 52 are provided with guiding grooves 521. The upper frame body 3 is provided with guiding insertion members 33 at positions corresponding to the guiding grooves 521. The bearing frame 4 is provided with guiding through holes 422 at positions corresponding to the guiding grooves 521. The guiding insertion members 33 pass through the guiding through holes 422 to be in insertion fit with the guiding grooves 521. A guiding member 45 and a guiding groove are arranged between the second insertion groove 43 and the second insertion member 53, and the guiding member 45 is slidably matched with the guiding groove. The upper frame body 3, the bearing frame 4, and the lower frame body 5 are made of injection materials. A dust cover 6 is arranged between the outer ring 2 and the inner ring 1. A first connecting step 11 is formed on an inner wall of the outer ring 2, a second connecting step 12 is formed on an outer wall of the inner ring 1, and the dust cover 6 is clamped between the first connecting step 11 and the second connecting step 12.

A fourth embodiment of a deep groove ball bearing with a split cage of the present disclosure is shown in FIG. 1, FIG. 2, and FIG. 4, including an outer ring 2, an inner ring 1, a cage, and steel balls. The cage is arranged between the outer ring 2 and the inner ring 1. The cage is split into an upper frame body 3, a bearing frame 4, and a lower frame body 5. Pocket grooves 41 configured to accommodate the steel balls are formed in the bearing frame 4 at intervals. The bearing frame 4 is provided with a connecting piece between any two adjacent pocket grooves 41. A first insertion groove 42 is formed in an outer wall of the connecting piece. A second insertion groove 43 is formed in an inner wall of the connecting piece. A connecting groove 44 is formed in a bottom surface of the pocket groove 41. An oil storage cavity 34 is formed in the upper frame body 3. An opening of the oil storage cavity 34 is arranged toward the connecting groove 44. The oil storage cavity 34 is provided with oil storage cotton. The oil storage cavity 34 is provided with a positioning flange 31 in a circumferential direction of the opening. The positioning flange 31 is in insertion fit with the connecting groove 44 to form a fixed connection between the upper frame body 3 and the bearing frame 4. The lower frame body 5 is provided with arc-shaped grooves 51 at positions corresponding to the pocket grooves 41. The arc-shaped groove 51 and the pocket groove 41 are combined to form a pocket hole. A connecting seat 55 is formed between any two adjacent arc-shaped grooves 51 on the lower frame body 5. A first insertion member 52 and a second insertion member 53 are arranged on the connecting seat 55. A clamping gap 54 is formed between the first insertion member 52 and the second insertion member 53. The first insertion member 52 is in insertion fit with the first insertion groove 42. The second insertion member 53 is in insertion fit with the second insertion groove 43. Ends of the first insertion member 52 and the second insertion member 53 pass through the bearing frame 4 and form positioning members 56. The upper frame body 3 is provided with positioning holes 32 at positions corresponding to the positioning members 56. The positioning member is in insertion fit with the positioning hole 32. The first insertion member 52 is arranged in a wedge shape, and a shape of the first insertion groove 42 is matched with the shape of the first insertion member 52. Both side walls of the first insertion member 52 are arranged in a wave shape, both side walls of the first insertion groove 42 are provided with abutting elastic pieces 421 at intervals, and the abutting elastic pieces 421 are arranged obliquely. The upper frame body 3, the bearing frame 4, and the lower frame body 5 are made of injection materials. A dust cover 6 is arranged between the outer ring 2 and the inner ring 1. A first connecting step 11 is formed on an inner wall of the outer ring 2, a second connecting step 12 is formed on an outer wall of the inner ring 1, and the dust cover 6 is clamped between the first connecting step 11 and the second connecting step 12.

A fifth embodiment of a deep groove ball bearing with a split cage of the present disclosure is shown in FIG. 1, FIG. 2 and FIG. 5, including an outer ring 2, an inner ring 1, a cage, and steel balls. The cage is arranged between the outer ring 2 and the inner ring 1. The cage is split into an upper frame body 3, a bearing frame 4, and a lower frame body 5. Pocket grooves 41 configured to accommodate the steel balls are formed in the bearing frame 4 at intervals. The bearing frame 4 is provided with a connecting piece between any two adjacent pocket grooves 41. A first insertion groove 42 is formed in an outer wall of the connecting piece. A second insertion groove 43 is formed in an inner wall of the connecting piece. A connecting groove 44 is formed in a bottom surface of the pocket groove 41. An oil storage cavity 34 is formed in the upper frame body 3. An opening of the oil storage cavity 34 is arranged toward the connecting groove 44. The oil storage cavity 34 is provided with oil storage cotton. The oil storage cavity 34 is provided with a positioning flange 31 in a circumferential direction of the opening. The positioning flange 31 is in insertion fit with the connecting groove 44 to form a fixed connection between the upper frame body 3 and the bearing frame 4. The lower frame body 5 is provided with arc-shaped grooves 51 at positions corresponding to the pocket grooves 41. The arc-shaped groove 51 and the pocket groove 41 are combined to form a pocket hole. A connecting seat 55 is formed between any two adjacent arc-shaped grooves 51 on the lower frame body 5. A first insertion member 52 and a second insertion member 53 are arranged on the connecting seat 55. A clamping gap 54 is formed between the first insertion member 52 and the second insertion member 53. The first insertion member 52 is in insertion fit with the first insertion groove 42. The second insertion member 53 is in insertion fit with the second insertion groove 43. Ends of the first insertion member 52 and the second insertion member 53 pass through the bearing frame 4 and form positioning members 56. The upper frame body 3 is provided with positioning holes 32 at positions corresponding to the positioning members 56. The positioning member is in insertion fit with the positioning hole 32. Coating cotton is arranged in the arc-shaped groove 51 of the lower frame body 5, and cooling liquid is adsorbed in the coating cotton. The lower frame body 5 is provided with liquid storage cavities configured to store the cooling liquid at positions corresponding to the arc-shaped grooves 51, and the liquid storage cavity is connected to the coating cotton through a connecting tube. The first insertion member 52 is arranged in a wedge shape, and a shape of the first insertion groove 42 is matched with the shape of the first insertion member 52. Both side walls of the first insertion member 52 are provided with guiding grooves 521. The upper frame body 3 is provided with guiding insertion members 33 at positions corresponding to the guiding grooves 521. The bearing frame 4 is provided with guiding through holes 422 at positions corresponding to the guiding grooves 521. The guiding insertion members 33 pass through the guiding through holes 422 to be in insertion fit with the guiding grooves 521. A guiding member 45 and a guiding groove are arranged between the second insertion groove 43 and the second insertion member 53, and the guiding member 45 is slidably matched with the guiding groove. The upper frame body 3, the bearing frame 4, and the lower frame body 5 are made of injection materials. A dust cover 6 is arranged between the outer ring 2 and the inner ring 1. A first connecting step 11 is formed on an inner wall of the outer ring 2, a second connecting step 12 is formed on an outer wall of the inner ring 1, and the dust cover 6 is clamped between the first connecting step 11 and the second connecting step 12.

The above embodiment is just one of the preferred specific embodiments of the present disclosure, and various variations and substitution procedures made by those skilled in the art within the scope of the technical solution of the present disclosure shall be all included in the protection scope of the present disclosure.

What is claimed is:

1. A deep groove ball bearing with a split cage, comprising:
    an outer ring,
    an inner ring,
    a cage, and
    steel balls, wherein
    the cage is arranged between the outer ring and the inner ring, the cage is split into an upper frame body, a bearing frame, and a lower frame body, pocket grooves configured to accommodate the steel balls are formed in the bearing frame at intervals, the bearing frame is provided with a connecting piece between any two adjacent pocket grooves, a first insertion groove is formed in an outer wall of the connecting piece, a second insertion groove is formed in an inner wall of the connecting piece, a connecting groove is formed in a bottom surface of each of the pocket grooves, an oil storage cavity is formed in the upper frame body, the oil storage cavity is arranged toward the connecting groove, the oil storage cavity is provided with a positioning flange, the positioning flange is in insertion fit with the connecting groove to form a fixed connection between the upper frame body and the bearing frame, the lower frame body is provided with arc-shaped grooves at positions corresponding to the pocket grooves, each of the arc-shaped grooves and each of the pocket grooves are combined to form a pocket hole, a connecting seat is formed between any two adjacent arc-shaped grooves on the lower frame body, a first insertion member and a second insertion member are arranged on the connecting seat, a gap used for clamping is formed between the first insertion member and the second insertion member, the first insertion member is in insertion fit with the first insertion groove, the second insertion member is in insertion fit with the second insertion groove, ends of the first insertion member and the second insertion member pass through the bearing frame and form positioning members, the upper frame body is provided with positioning holes at positions corresponding to the positioning members, and each of the positioning members is in insertion fit with each of the positioning holes.

2. The deep groove ball bearing with the split cage according to claim 1, wherein the lower frame body is provided with liquid storage cavities configured to store cooling liquid at positions corresponding to the arc-shaped grooves.

3. The deep groove ball bearing with the split cage according to claim 2, wherein the first insertion member is arranged in a wedge shape, and a shape of the first insertion groove is matched with the wedge shape of the first insertion member.

4. The deep groove ball bearing with the split cage according to claim 1, wherein the first insertion member is arranged in a wedge shape, and a shape of the first insertion groove is matched with the wedge shape of the first insertion member.

5. The deep groove ball bearing with the split cage according to claim 4, wherein both side walls of the first insertion member are arranged in a wave shape, both side walls of the first insertion groove are provided with abutting elastic pieces at intervals, and the abutting elastic pieces are arranged obliquely.

6. The deep groove ball bearing with the split cage according to claim 4, wherein both side walls of the first insertion member are provided with guiding grooves, the upper frame body is provided with guiding insertion members at first positions corresponding to the guiding grooves, the bearing frame is provided with guiding through holes at second positions corresponding to the guiding grooves, and the guiding insertion members pass through the guiding through holes to be in insertion fit with the guiding grooves.

7. The deep groove ball bearing with the split cage according to claim 1, wherein a guiding member and a guiding groove are arranged between the second insertion groove and the second insertion member, and the guiding member is slidably matched with the guiding groove.

8. The deep groove ball bearing with the split cage according to claim 1, wherein the upper frame body, the bearing frame, and the lower frame body are made of injection materials.

9. The deep groove ball bearing with the split cage according to claim 1, wherein a dust cover is arranged between the outer ring and the inner ring.

10. The deep groove ball bearing with the split cage according to claim 9, wherein a first connecting step is formed on an inner wall of the outer ring, a second connecting step is formed on an outer wall of the inner ring, and the dust cover is clamped between the first connecting step and the second connecting step.

* * * * *